R. F. Maynard.
Metallic Mill.

N° 16,988.    Patented Apr. 7, 1857.

UNITED STATES PATENT OFFICE.

RICHARD F. MAYNARD, OF BALTIMORE, MARYLAND.

CORN AND COB MILL.

Specification of Letters Patent No. 16,988, dated April 7, 1857.

*To all whom it may concern:*

Be it known that I, RICHARD F. MAYNARD, of Baltimore, in the State of Maryland, have invented an Improvement in Corn and Cob Crushers, and that the following is a full, clear, and exact description of the principle or character which distinguishes it from all other things before known and of the usual manner of making, modifying, and using the same, reference being had to the annexed drawings, of which—

Figure 1:
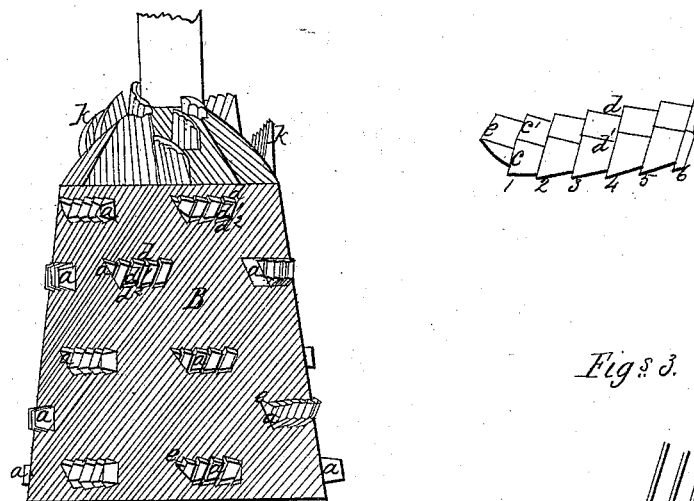
Figure 3:
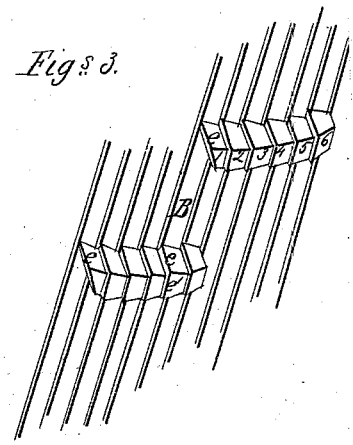
Figure 2:
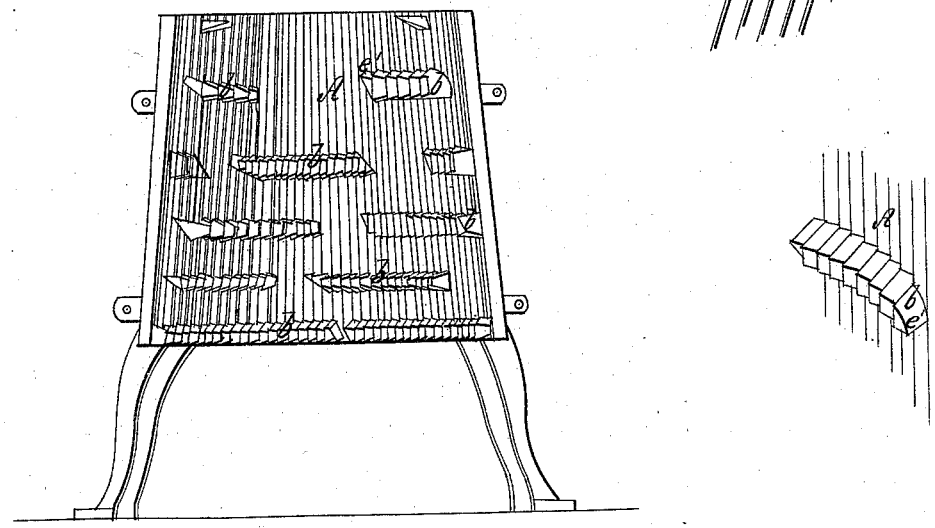

Figure 1 represents a side elevation of the cylinder B; Fig. 2 the same view as in Fig. 1 of the concave; Fig. 3 detached parts of the crusher enlarged and shown in different views.

My invention consists in an improvement in corn and cob crushers described as follows—Upon a ribbed or furrowed concave A, and upon a ribbed or furrowed cylinder B, I cast or otherwise attach several series of teeth $a$, $a$—$b$, $b$, of a peculiar form and having a peculiar action. These teeth have two cutting edges $c$, $c'$, three grinding surfaces $d$, $d'$, $d^2$, and an inclined or tapering front $e$, $e'$, and are arranged on the concave and cylinder so as to break points and to operate as a series of interrupted screw threads, acting conjointly to cut, crush, and grind the corn and cobs, and propel them through the machine.

Each tooth is constructed with several articulated portions 1,—2,—3,—4,—5,—6,— each portion being somewhat wedge form so that the projecting angles form a series of sharp cutting points which, acting in conjunction with the cutting edges and grinding surfaces completely comminute the corn and cobs. The breakers $k$, $k$, on the top of the cylinder are similar to those in common use and the corresponding ones on the concave are not shown in the drawings.

I do not claim the form of the grinding teeth set forth, but

I do claim—

The arrangement of these teeth so as to break points and to form a series of interrupted screw threads by their inclined points as herein set forth.

R. F. MAYNARD.

Witnesses:
   T. CAMPBELL,
   JOHN S. HOLLINGSHEAD.